No. 788,857.

Patented May 2, 1905.

UNITED STATES PATENT OFFICE.

GASTON AMÉDÉE THUBÉ AND LOUIS PRÉAUBERT, OF NANTES, FRANCE.

ADHESIVE AND METHOD OF MAKING SAME.

SPECIFICATION forming part of Letters Patent No. 788,857, dated May 2, 1905.

Application filed June 22, 1903. Serial No. 162,666.

*To all whom it may concern:*

Be it known that we, GASTON AMÉDÉE THUBÉ and LOUIS PRÉAUBERT, citizens of the Republic of France, and residents of Nantes, France, have invented new and useful Improvements in Adhesives and Methods of Making the Same, which are fully set forth in the following specification.

The object of this invention is to prepare an adhesive material from glue and like substances with casein as its chief constituent for use as an adhesive or glue or thickening medium for painting, printing, and other purposes, and to render its application easy and practical. For this purpose we utilize the emulsifying properties of such glues.

A glue with casein as chief constituent easily forms an emulsion with oils, fatty substances, varnishes, tar, hydrocarbons, wax, or the like and generally with substances that do not dissolve in water, but can be mixed with the glue by trituration in liquid state as a paste or in solution.

The preparation of the new product is effected as follows: We take a solution of casein in water by adding either an alkali or some other substance capable of causing the casein to dissolve in water. The proportions used may be as follows: casein, ten to twenty per cent.; emulsifiable substance, ten to thirty per cent.; the rest being water containing the dissolvent without any excess of the latter. For the emulsifiable substance we take linseed-oil, boiled, or siccative oil, or even a heavy petroleum-oil, such as used for lubricating purposes. Other substances could, however, be used according to circumstances, as already stated. The consistency of the product should be that of a thick and sticky cream, the amount of water contained regulating the consistency of the whole. The preparation preferably takes place at a temperature of from 40° to 50° centigrade, the whole being constantly stirred. The material becomes thicker when it is cold. The mixture is stored in a thick and viscous state. When it is to be used, the necessary quantity of water is added to it to obtain the necessary consistency for the purpose for which it is to be used. The preparation is rendered easy if the mass is kept at a great viscosity. It is advisable to dissolve the casein in a minimum of liquid and to add to it the oil and the remaining quantity of water gradually, keeping the whole thoroughly stirred the whole time by some suitable stirring device. When correctly prepared, the emulsion has a very uniform appearance and an exceedingly fine grain, visible only when considerably magnified.

This emulsion can be used for many purposes. We will give some of them; but it must be understood that they are given merely by way of example. The emulsion can, for instance, be used directly as a glue or cement in the same way as ordinary glue or it may be used for preparing products suitable for printing and painting. For preparing a product suitable for printing we add to the emulsion during its preparation dye substances in solution. We then dilute the whole to the desired consistency and use it as printing-ink in the usual manner. Oil in the form of an emulsion has the advantage of preserving all its brightness. When dry, the intensity of the color does not diminish, but may even slightly increase. When used for painting purposes, the use of the emulsion constitutes, owing to the oil held in a state of emulsion, an entirely different process from painting with size or casein paint. The ordinary pigments in order to be incorporated with the emulsion are ground, either with oil or with some other liquid or added simply in powdered form. Owing to the product being in the state of an emulsion, although it contains oils, it can be diluted with water without its homogeneity being affected to give it the necessary consistency to enable it to be spread or laid on by means of a brush or by any other means. The paint thus formed is a real oil-paint. It has exactly the same appearance and quality, and it does not lose any freshness of color in drying, as happens to painting prepared with size. The casein glue or size forming an ingredient of the emulsion is a siccative, so that it is possible in manufacturing it to replace linseed-oil by a non-siccative oil or even by a very little colored hydrocarbon or such like substance.

Our product enables a great number of uses to be obtained by varying its composition. For instance, the emulsion can be prepared with little or much oil, according as it is desired to have a dull or shiny appearance. It is possible to obtain a varnish-paint by adding fatty varnish, resin, or gum. Finally, for white and other light shades some powder-like chalk or kaolin can be added to the emulsion either during or after its preparation to insure the better coating of the paint. In order to obtain an economic paint for coating purposes for sizing canvas and covering other fabrics and for other similar applications, tar, asphalt, &c., could be emulsified in the casein glue. Tar or asphalt suitably softened by heat is added to the emulsion, the process being the same as with oils. In order to have a slightly more fatty product, we can add to it some oil or even some fatty substance, such as tallow, grease, fat, waste, &c. These preparations applied as they are constitute very reliable and cheap paints. In the same way and for the same purpose tar, asphalt, tallow, grease, fat, waste, or the like, and other suitable substances can be added to the emulsion even after its preparation, the emulsion playing the part of an agglomerant.

We claim—

1. The process of making adhesive compounds and the like, consisting in dissolving casein in water in presence of an alkali, maintaining the temperature between 40° and 50° centigrade, mixing drying-oil therewith to form an emulsion, and incorporating a hydrocarbon compound.

2. The process of making adhesive compounds and the like, consisting in dissolving casein in water in presence of an alkaline substance, maintaining the temperature between 40° and 50° centigrade, mixing oil therewith to form an emulsion, and incorporating tar therewith.

3. A composition of matter consisting of an emulsion of linseed-oil, casein, and alkali and water.

4. A composition of matter consisting of an emulsion of drying-oil, casein, alkali, water and a hydrocarbon.

5. A composition of matter consisting of an emulsion of oil, casein, alkali, water and tar.

In testimony whereof we have signed this specification in the presence of two subscribing witnesses.

GASTON AMÉDÉE THUBÉ.
LOUIS PRÉAUBERT.

Witnesses:
BENJ. H. RIDGELY,
YVES LE MEIGNERY.